Sept. 15, 1925.
J. B. FRANCISCO
VEHICLE HEATER
Filed Jan. 17, 1922
1,553,605
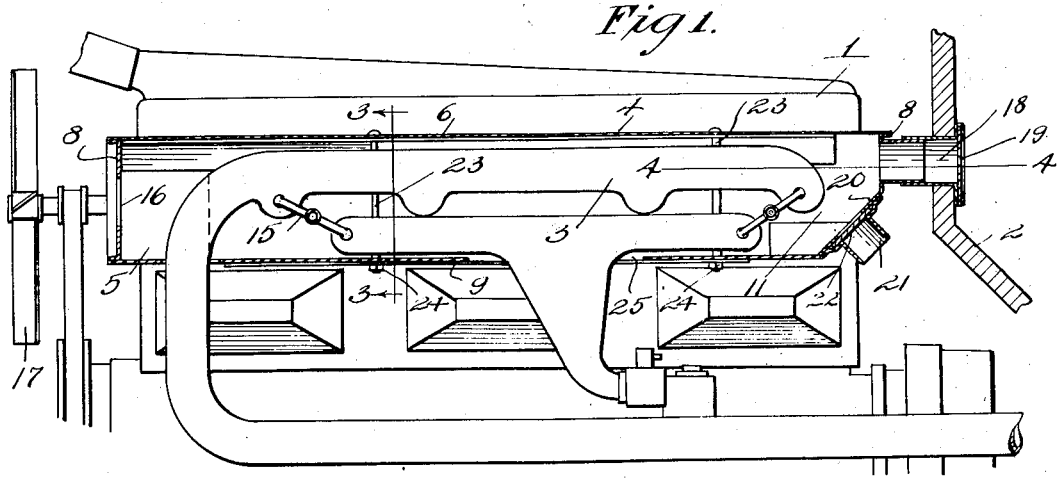
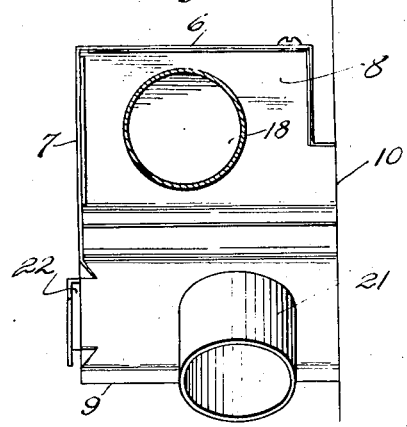
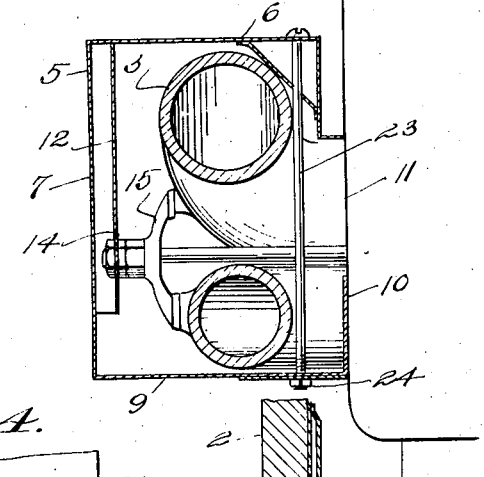
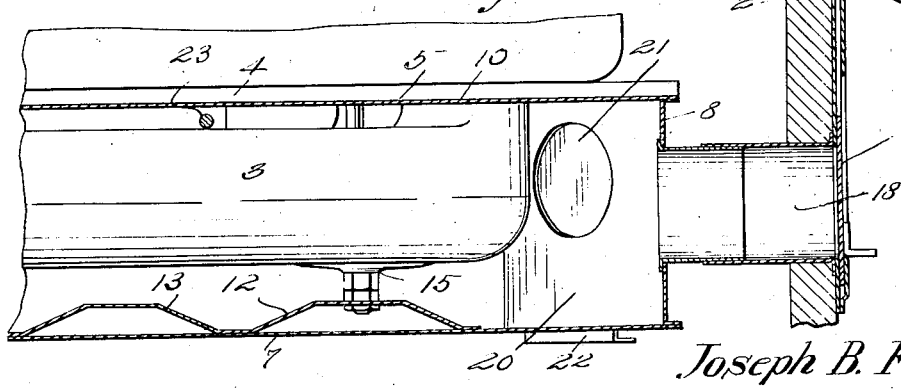
Inventor
Joseph B. Francisco
By C. C. Shepherd
Attorney Patented Sept. 15, 1925.

1,553,605

UNITED STATES PATENT OFFICE.

JOSEPH B. FRANCISCO, OF COLUMBUS, OHIO.

VEHICLE HEATER.

Application filed January 17, 1922. Serial No. 529,970.

*To all whom it may concern:*

Be it known that JOSEPH B. FRANCISCO, a citizen of the United States, residing at Columbus, in the county of Franklin and State of Ohio, has invented certain new and useful Improvements in Vehicle Heaters, of which the following is a specification.

This invention relates to improvements in vehicle heaters, and refers particularly to heaters of the type which are employed to surround the exhaust manifolds of internal combustion engines, in order that the heat radiated from such manifolds during engine operation may be received within the heater and conducted to the interior of associated vehicles, for the purpose of heating such vehicles in an efficient and inexpensive manner and to render the same comfortable for use during adverse weather conditions.

An object of the present invention resides in the provision of a heater of this character which will be formed to include inner and outer metallic shells or casings which serve to facilitate the application of the heater to the side of an engine so as to surround the exhaust manifold thereof, the said inner shell being employed to roughly conform with the shape of the manifold and adjacent engine parts, and the outer shell being employed to cover the inner shell so as to conceal the latter, and to assist in the retaining of the heat within the heater proper, and to enable the said heater to present a neat and well finished appearance when applied.

A further object of the invention rests in positioning the heater so that the latter will extend longitudinally of the exhaust manifold and to have its forward end positioned contiguous to the air circulating fan of the engine so that forced air circulation through the heater and along the surfaces of the exhaust manifold will be provided, the rear end of said heater terminating in a valve duct leading into the interior of the vehicle and capable of transferring the heat within the heater into the vehicle proper, the said heater being further provided with a valved outlet duct, whereby when the heater is not employed to heat an associated vehicle the same may be usefully employed in removing heat from under the hood of the vehicle, discharging said heat quickly and efficiently to the atmosphere so as to eliminate discomfort on the part of the vehicle occupants during the operation of an engine in warm weather.

For a further understanding of the invention reference is to be had to the following description and to the accompanying drawing, in which:

Figure 1 is a vertical longitudinal sectional view taken through the improved heater comprising the present invention and illustrating its application to a motor vehicle, Figure 2 is a rear elevation of the heater, Figure 3 is a vertical sectional view taken on the line 3—3 of Figure 1, and Figure 4 is a horizontal sectional view on the line 4—4 of Figure 1.

Referring more particularly to the details of the invention the numeral 1 designates generally an internal combustion engine which is employed in this instance for driving a motor vehicle, the dash construction of the vehicle being indicated by the numeral 2. The engine is formed to include the usual exhaust manifold 3, around which is positioned the heater 4 comprising the present invention, the latter being employed to deliver heat, obtained by radiation from the manifold 3, into the vehicle proper or, under other conditions, to remove the heat of the manifold from around the dash and hood structures and permitting of the controlled escape thereof to the atmosphere in order to relieve the vehicle occupants of the uncomfortable effects of engine heat when the vehicle is operated during warm weather.

To this end my heater consists of a sheet metal casing 5, which is formed to include top front end and bottom walls 6, 7, 8 and 9 respectively, the rear wall 10 being shortly terminated, with respect to the height of the casing, so that a longitudinally extending opening 11 will be provided in the rear of the casing permitting of the application of the latter around the manifold 3 and in contiguous relation with the side of the cylinder block of the engine.

To facilitate the application of the heater to the engine, the casing is provided internally with a skeleton shell 12, which is also formed from sheet metal and is provided with suitable corrugations 13 and slots 14 for the purpose of enabling the shell to readily receive the manifold retaining clamps 15 of the engine and effecting a secure seating of the casing upon the manifold. It will be apparent that by reason of the corrugations provided in the shell the ends of the clamps 15 will be enabled to be positioned between the shell and the casing proper, thus enabling the casing to surround the manifold and its connecting parts and thereby presenting a neat and well finished appearance when applied. The inner shell also serves to retain the heat derived from the manifold 3 within the casing and precludes undue radiation thereof through the exterior walls of the casing, a feature which is not to be found in heaters which employ but a single wall.

The front end wall 8 of the heater is provided with an air entrance opening 16, situated immediately to the rear of the air circulating fan 17 so that upon the operation of the fan forced air circulation will obtain within the casing, causing fresh air obtained from the front of the engine, to be passed longitudinally and rearwardly of the casing along the heated surfaces of the exhaust manifold 3, thereby raising the temperature of the circulating air during its longitudinal travel and permitting of the passage of the same, in a heated condition, through a longitudinally extending duct 18 connected with the rear end wall of the casing. The rear end of the duct 18 enters the vehicle through the dash 2, and has its rear end controlled by means of a sliding valve plate 19 which, upon manual operation, will be capable of regulating the entrance of heated air into the vehicle.

In this instance the casing is formed so that its rear end wall will include an angularly extending portion 20 and connected therewith is an outlet duct 21, which extends below the dash and is in open communication with the interior of the casing. The duct 21 is provided with a valve 22, in this instance in the form of a sliding plate which, when closed will compel the heat to pass through the duct 18, or if desired the valve 19 may be opened so that the heated air will pass through the duct 21. It will be seen, therefore, that by virtue of the construction described the casing is capable of operating in a dual capacity, to-wit, when employed as a heater the said casing through the medium of the duct 18 and the associated valve 19 will be adapted to deliver heated air into the interior of the vehicle for rendering the latter comfortable to operate under cold weather conditions and, secondly, by reason of the downwardly directed outlet duct 21 the said heater or casing, when employed in warm weather will be capable of concentrating engine heat within the confines thereof and to discharge the heat in such manner that the same will not in any way increase the heat within the vehicle. In fact, the heat of the manifold is discharged beneath the dash 2 and therefore is entirely disposed of in a manner that will prevent the spreading thereof into the vehicle. This construction will render my invention applicable to a motor vehicle for all yearly seasons and climatic conditions, the operation thereof being controlled by the valves 19 and 22 which are capable of being readily operated to secure desired results. If desired, the casing may be retained in place by providing bolts 23 which pass through registering openings formed in the top and bottom walls 6 and 9 thereof, the said bolts being located on the inner side of the manifold 3 and having their lower ends equipped with threaded fastening devices 24, which when threaded into place will securely bind the casing in its applied position and prevent dislocation thereof. The bottom wall of the casing is provided with the usual slots 25 through which the manifold branches of the engine may pass.

In view of the foregoing it is believed that the operation and construction of the invention will be readily understood and therefore a more extended explanation has been accordingly omitted. The air outlet provided by the heater not only is employed for the purpose of providing for the comfort of the occupants of the vehicle but is primarily directed to the end of removing heat from, in and about the engine for the express purpose of maintaining the temperature of the engine at a relatively normal degree, in order that overheating particularly on the part of an engine will be precluded, and the same remain cool and efficient even when operating under load conditions.

What is claimed is:

A manifold heater for motor vehicles comprising a sheet metal casing including front, top and bottom walls, the rear side of said casing being open to permit of the application of the casing around the manifold structure of an engine, vertical fastening devices passing through the top and bottom walls of said casing adjacent to the inner side of the casing and adapted to pass between the manifold structure and the side wall of an engine head, and a supporting plate mounted within said casing adjacent to the front wall thereof and adapted to seat upon said manifold structure to maintain the casing in an operative position.

In testimony whereof I affix my signature.

JOSEPH B. FRANCISCO.